United States Patent [19]

Johnson

[11] Patent Number: 5,018,440

[45] Date of Patent: May 28, 1991

[54] TANK FOR TREATING UNITS OF A PRODUCT

[76] Inventor: Norman L. Johnson, 2456 Morning Star Trail, Green Bay, Wis. 54302

[21] Appl. No.: 310,093

[22] Filed: Feb. 14, 1989

[51] Int. Cl.$^5$ .................... A23C 19/00; A01J 25/00
[52] U.S. Cl. ........................ 99/535; 99/452; 99/455; 134/132; 406/50
[58] Field of Search ................... 99/452–455, 99/460, 516, 534, 535, 536; 426/583, 36, 512, 516; 134/65, 132; 406/50, 106, 47

[56] References Cited

U.S. PATENT DOCUMENTS

| | | | |
|---|---|---|---|
| 1,310,662 | 7/1919 | Kellington | 99/535 |
| 1,641,441 | 9/1927 | Kolbe . | |
| 2,672,372 | 3/1954 | Jones et al. | 406/50 |
| 2,838,288 | 6/1958 | Stoelting . | |
| 3,482,508 | 12/1969 | Bajcar et al. | 99/535 |
| 3,499,687 | 3/1970 | Ellis | 406/106 |
| 3,713,850 | 1/1973 | Gasbjerg | 99/516 |
| 3,910,174 | 10/1975 | Nelles | 99/452 |
| 4,068,014 | 1/1978 | Heimbruch | 426/582 |
| 4,787,300 | 11/1988 | Mette | 99/470 |
| 4,869,161 | 9/1989 | LaCount | 99/455 |

*Primary Examiner*—Timothy F. Simone
*Attorney, Agent, or Firm*—Thomas D. Wilhelm

[57] ABSTRACT

Novel apparatus for liquid treatment of units of a product such as blocks of cheese wherein the units are floated in a flowing stream of the treatment liquid and are conveyed by the treating liquid from an inlet of the tank to an outlet of the tank. For some embodiments, a minimum turning radius is defined. Also, for some embodiments, the tank comprises a pair of first and second side-by-side conveying channel members converging from an outer perimeter defined by an outermost loop to an innermost loop defined by innermost portions of the pair of channel members and wherein portions of the first and second conveying channel members of the innermost loop are separated from side-by-side relationship over a portion of the innermost loop, and join to each other as in end-to-end relationship, such that liquid entering the innermost loop through one of the first and second conveying channel members leaves the innermost loop through the other of the first and second conveying channel members.

41 Claims, 3 Drawing Sheets

TANK FOR TREATING UNITS OF A PRODUCT

BACKGROUND OF THE INVENTION

In the manufacture of certain types of cheese, the cheese curd is formed into molded units or blocks which are soaked in brine. At the time the curd is introduced into the molds, it is at an elevated temperature. Typically, the cheese is cooled in a chill or cooling tank, after which the cheese is ejected from the mold as a block or unit and introduced into the brine tank. Brine soaking has been carried out by permitting the floating blocks to arrange themselves in an indiscriminate manner during the brine soaking period. The brine soaking step typically takes from one to three hours, and in some cases up to 24 hours. The cheese blocks may be turned over by hand and salt may be sprinkled on the exposed surfaces. Such conventional practice makes it difficult to maintain a continuous production schedule and involves considerable manual labor. The manual handling is, of course, detrimental to good sanitary conditions in the food manufacturing process.

This invention relates generally to cheese manufacturing methods and apparatus. More particularly, it pertains to methods and apparatus for carrying out the brine soaking operation.

In general, it is an object of the present invention to provide a manufacturing method and apparatus in which a soaking step is carried out in an automated manner, with a minimum of labor and manual handling in combination with a minimum usage of floor space.

Another object is to provide a method and process in which product units in a soaking tank advance serially in an orderly fashion.

Another object is to carry out soaking operations in such a manner that, during normal continuous operation the floating units are all subjected to the soaking solution for the same predetermined period of time.

SUMMARY OF THE INVENTION

Certain embodiments of the invention are seen in a tank for treating units of a solid product with a liquid, the tank comprising a conveying channel, and the channel being configured as a series of loops. The loops have inner and outer walls disposed respectively toward the inside and outside of the respective loops. The conveying channels converge, from an outer perimeter defined by an outermost one of the loops, to an innermost one of the loops. The innermost loop defines a minimum turning radius in the conveying channel at the inner wall of the innermost loop. The numerical dimension of the minimum turning radius is at least about 0.4 times, preferably at least about 0.8 times, the maximum length dimension of the largest units of product which are anticipated to be treated with the tank.

In preferred embodiments, the minimum turning radius is at least about 2 inches, desirably at least about 4 inches.

In some embodiments, the tank will include an exit/entrance channel extending from the innermost loop outwardly across the series of loops toward the outer perimeter.

In some embodiments, the conveying channel comprises a pair of first and second side-by-side conveying channel members arranged in loops. The loops converge from an outer perimeter defined by an outermost loop, to an innermost loop defined by portions of the pair of channel members. The first and second conveying channel members of the innermost loop are separated from side-by-side relationship over a portion of the innermost loop, and join with each other as in end-to-end relationship, such that liquid flowing between the first and second conveying channel members in that innermost loop traverses a radius at least as great as the minimum turning radius.

Generally, the units of product define a length dimension, and a width dimension no greater than the length dimension. The width of the conveying channel is preferably between about 1.03 and about 1.5 times the width dimension of the units of product. Preferably, the dimension of the minimum turning radius is no more than 1.5 times the length dimension of the units of product.

In some embodiments contemplated in the invention, the tank includes means for withdrawing liquid from the conveying channel at a first location, means for adding liquid to the conveying channel at a second location, and a barrier, in the conveying channel, to flow of liquid between those first and second locations. Preferably, the tank includes means for recycling the brining liquid between the first and second locations. Some embodiments of the tank include means for reversing the flow of the liquid in the tank between the first and second locations. In some embodiments, the tank includes means for conveying units of the product out of the conveying channel, at, for example, the second location, over the barrier, and back into the conveying channel at the first location.

In some embodiments, the invention can be defined separately as a tank comprising a conveying channel, where the conveying channel is configured as a series of loops, the conveying channel converging from an outer perimeter, defined by an outermost loop, to an innermost loop, and including an exit/entrance channel extending from the innermost loop outwardly across the series of loops toward the outer perimeter.

The invention can also be defined separately as a tank, where the tank comprises a conveying channel, the conveying channel comprising a pair of first and second side-by-side conveying channel members arranged in loops. The loops converge from an outer perimeter defined by an outermost loop to an innermost loop defined by innermost portions of the pair of channel members. In this embodiment, the innermost portions of the first and second conveying channel members, of the innermost loop, are separated from side-by-side relationship over a portion of the innermost loop, and join with each other as in end-to-end relationship such that liquid entering the innermost loop through one of the first and second conveying channel members leaves the innermost loop through the other of the first and second conveying channel members.

In some embodiments of this invention, which include an outermost pair of channel members defining the outermost loop, the first and second conveying channel members extend from the outermost loop and are separated from side-by-side relationship, and include means for joining those first and second conveying channel members with each other, as in end-to-end relationship, such that liquid flowing between the first and second conveying channel members as they emerge from the outermost loop traverses a radius at least as great as the defined minimum turning radius. In these embodiments, the conveying channel may comprise a continuous loop and the tank may include means for maintaining a continuous flow of the liquid circulating through the length of the continuous conveying channel.

The tank apparatus may include means for applying liquid to exposed portions of the units of product in the conveying channel.

The tanks of the invention are adapted for use in a system for treating units of a product with a liquid wherein the system comprises a plurality of the units of the product to be treated, a tank of the invention as described herein, and the treating liquid in the conveying channel of the tank for treating the units, the units being disposed in the liquid which is in the conveying channel of the tank.

The invention further comprises a method for treating units of a product with a treatment liquid. The method comprises selecting or formulating the treatment liquid composition such that it is capable of floating the units of product, placing the liquid in one of the tanks of the invention which comprises the pair of loops, floating the units of product in the liquid in the conveying channel, and effecting flow of the liquid in the conveying means, whereby the units of product are conveyed along the conveying means to the innermost loop in one of the first and second channel members and out of the innermost loop in the other of first and second channel members, and outwardly of the series of loops to the outer perimeter.

In some embodiments, the method includes connecting portions of the first and second conveying channel members comprising the outermost loops such that ones of the units of product flowing outwardly of the outermost loop in one of the first and second channel members are returned inwardly of the outermost loop in the other of the first and second channel members, in a continuous circulation of the units through the tank, as the units of product flow inwardly and outwardly through the continuous conveying channel. The method may include maintaining a continuous flow of the liquid circulating through the length of the continuous loop.

Alternatively, the method may include reversing the direction of flow of the treatment liquid and thereby reversing the direction of flow of the units of product. This step in the process is usually accompanied by positioning a barrier in the conveying channel between the first and second channel members in the outermost loop, where that outermost loop is continuous.

The apparatus of the invention comprehends apparatus for applying the liquid to exposed portions of units of the product. Accordingly, the method of the invention comprehends applying the treatment liquid to exposed portions of units of the product, typically by applying disbursed droplets or streams of the liquid to the tops and/or sides of the units of product, preferably, but not necessarily, in each of the loops of the conveying channel.

DETAILED DESCRIPTION OF THE ILLUSTRATED EMBODIMENTS

Figure 1:
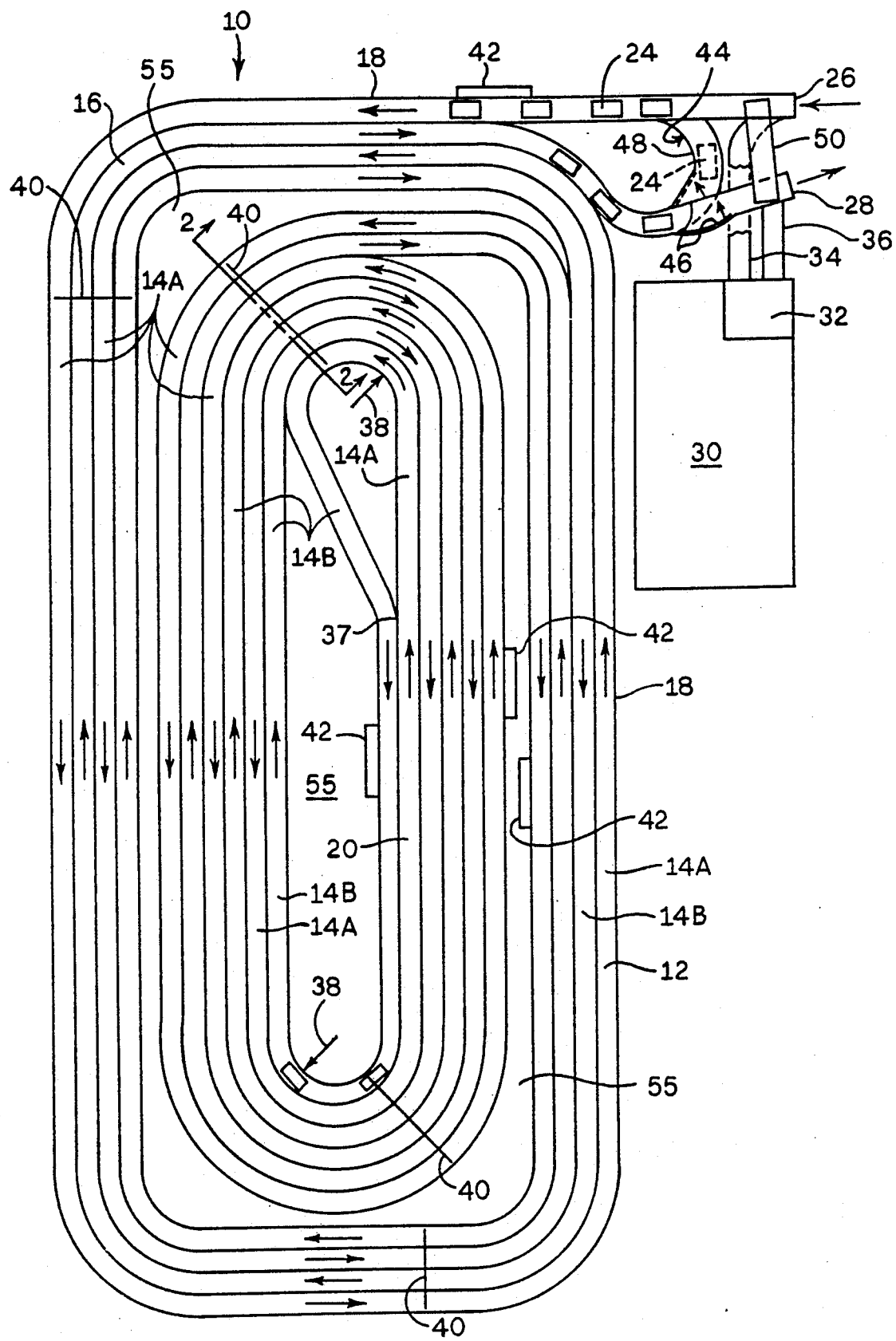
FIG. 1 is a top view of a preferred embodiment of tanks of this invention.

FIG. 1 illustrates a preferred embodiment of the tanks of this invention. The tank 10 comprises a conveying channel 12. The conveying channel 12 comprises a pair of conveying channel members 14A and 14B. Conveying channel members 14 comprise loops 16. The loops converge from an outer perimeter 18 defined by an outermost loop to an innermost loop 20 defined by portions of the channel members 14A and 14B. The first and second channel members 14A and 14B of the innermost loop 20 are separated from side-by-side relationship over a portion of the innermost loop, and join their conveying channels 12 as in end-to-end relationship such that liquid 22 entering the innermost loop through one of the first and second conveying channel members 14A and 14B leaves the innermost loop 20 through the other of the first and second conveying channel members 14A and 14B.

As seen in FIG. 1, blocks of cheese 24 enter the tank at tank treatment inlet 26 and exit the tank at tank treatment exit 28. As the blocks of cheese 24 enter at inlet 26, they are floated on a flowing stream of the brine treatment liquid 22 which is being used in treatment of the blocks of cheese. The brine liquid 22 is pumped from a brine reservoir 30 by a pump 32 through a pipe 34 to the treatment inlet 26. The brine flows from treatment inlet 26 through conveying channel member 14A in an inwardly directed spiral as indicated by the arrows in channel member 14A. The brine liquid is accordingly drained from the conveying channel 12 into the brine reservoir through pipe 36 at exit 28. By constantly adding brine liquid to conveying channel member 14A at inlet 26 and withdrawing it from the conveying channel member at exit 28, there is effected a continuous flowing of the treating brine through the loops of the tank. Thus blocks of cheese 24 which enter the tank at inlet 26 flow inwardly through conveying channel members 14A to the innermost loop, and then outwardly through conveying channel member 14B, toward the tank exit 28.

Each loop of the paired conveying channel members 14A and 14B, comprises an inwardly directed channel member 14A which carries the liquid toward the interior of the spiral, and an outwardly directed channel member 14B which carries the liquid outwardly of the spiral. The paired channel members, and the loops, are generally arranged in side-by-side relationship as seen in FIG. 1. At the innermost loop 20, the side-by-side relationship is interrupted at separation point 37, and the loops traverse a minimum turning radius 38 which is seen to be one of the important features of the invention herein. Should dimension of the minimum turning radius be violated, whereby the radius 38 is smaller than the defined minimum size, the blocks of cheese may be unable to traverse the turn, without further assistance; especially blocks of the dimensions used for defining the size of the minimum turning radius. Rather, the cheese blocks will tend to stop flowing with the flow of the brining liquid and may require at least a periodic further assistance in order to resume the flow along the conveying channel. Thus the dimension of the minimum turning radius is defined with respect to the size of the largest blocks of cheese which are anticipated to be used in a given tank. The larger the blocks of cheese, generally the larger will be the minimum turning radius 38.

In accordance with the design of the tank illustrated in FIG. 1, the minimum turning radius occurs at two locations on the innermost loop, both of which are illustrated and indicated as 38 in FIG. 1. So long as all turns in the tank loops have a turning radius at least as large as the minimum turning radius 38, the cheese blocks can be expected to proceed along the conveying channel, propelled only by the flowing of the treating brine liquid, and without further mechanical assist. In accordance with the minimum turning radius defined herein, the width of the conveying channel 12 is between about 1.03 times and about 1.50 times the width of the blocks of cheese which are being treated in the tank. If the channel is less than 1.03 times the width of the cheese block, then the channel will be too narrow for the cheese block to navigate along the conveying channel. If the channel is wider than about 1.50 times the width of the cheese blocks, then the cheese blocks can become wedged one against the other in a side-by-side relationship, whereby the continuous advancement of the cheese blocks is also interrupted.

As the blocks of cheese traverse the conveying channel 12, they pass under a plurality of drip pipes 40, which apply a continuous stream of droplets of the brine liquid to the exposed portions, and especially the tops of the blocks of cheese as they are conveyed along the conveying channel. Spray apparatus could be used equally well if the spray is appropriately confined. It is only necessary that the exposed portions of the cheese blocks be kept moist with the brine as they traverse the conveying channel.

In some embodiments of the invention, a plurality of booster pumps 42 enhance the flow of the liquid as it goes by the pumps. Booster pumps 42 operate in known conventional manner and may or may not be tied into the main brine reservoir 30.

Tank 10 of FIG. 1 illustrates a bypass 44 which includes a pair of bypass gates 46 and a bypass channel connector 48.

FIG. 1 also illustrates an optional elevator 50 which is a mechanical elevator for elevating blocks of cheese from channel member 14B at exit 28, and replacing them in channel member 14A at inlet 26.

The flow of brining liquid 22 through the length of conveying channel 12 is effected by creating an hydraulic head at inlet 26 which is sufficiently higher than the liquid height at outlet 28, to cause the flow of the brining liquid. Generally, the bottom 51 of conveying channel 12 is horizontal throughout the length of channel 12. It is acceptable, however, to provide a downwardly directed slope in bottom 51, in the desired direction of flow of the treating liquid, in some embodiments.

The treatment liquid is preferably a solution of salt and water. Other treatment liquid compositions may be used, if desired.

The preferred operation of the tank in FIG. 1 is generally carried out as follows. The treating brine is placed in brine reservoir 30. The temperature of the brine is adjusted, by means not shown, as the circulation of the brine is begun using pump 32. In general, the brine preferably is pumped by pump 32 through pipe 34 and enters channel member 14A at inlet 26 and traverses channel member 14A inwardly to the innermost loop 20 and subsequently traverses channel member 14B outwardly to the exit 28. At exit 28 the brine is preferably drained into the brine reservoir and is recirculated by pump 32 back into channel member 14A at inlet 26. As desired, the rate of flow of the treating liquid can be boosted by one or more of booster pumps 42. Brine is also circulated through the drip pipes 40. Once the brine system has reached the appropriate temperature and the liquid flow rate has reached a steady state at the desired rate of flow, then the tank is ready to receive and treat blocks of cheese. The cheese enters the tank generally at inlet 26. The blocks of cheese float on the brine. As the brine flows along the conveying channel, the blocks of cheese are carried with it. As the blocks of cheese pass underneath the drip pipes 40, the exposed portions of the cheese blocks are treated with the brine at appropriate intervals such that the entire block remains wetted by the brine. The blocks of cheese flow inwardly along channel member 14A to the innermost loop 20 and subsequently flow outwardly in channel member 14B to the outermost loop. If the blocks of cheese are to traverse a single pass through the system, namely once inwardly along channel member 14A and once outwardly along channel member 14B, they are removed from the tank at exit 28.

The tank may receive blocks of cheese before steady state is reached. However, some uniformity of treatment may be compromised.

The tank may be configured for multiple pass and reverse flow operation as desired. The multiple pass operation is effected by use of the exit bypass 44 or the elevator 50. While FIG. 1 shows both the bypass 44 and the elevator 50, typically only one of those two features would be embodied in a given tank. The elevator 50 is a bucket elevator which picks up the blocks of cheese as they approach exit 28, lifts them out of channel member 14B at exit 28, and returns them to channel member 14A at inlet 26. The flow of the brining liquid then carries the blocks of cheese through the length of the tank conveying channel 12 again. When the blocks of cheese have been treated for the desired length of time, the elevator 50 is temporarily disabled and the blocks of cheese are removed at exit 28.

In the alternative embodiment, in which the bypass 44 is used, the elevator 50 is usually not present. Bypass 44 includes the bypass channel connector 48 which is a section of conveying channel connecting exit 28 and inlet 26, and two bypass gates 46. Bypass gates 46 are shown in the closed position whereby the bypass is disabled. In order to use the bypass, gates 46 are pivoted as shown by the arrows to the positions shown in dashed outline, whereby the bypass channel connector 48 is connected to the inlet and exit legs of the conveying channel as at 26 and 28. With the exit bypass activated, blocks of cheese which approach the exit 28 are conveyed along bypass channel connector 48 back into the inlet portion of channel member 14A. A single block of cheese 24 is shown in dashed outline in the bypass 44 along with a dashed arrow indicating the direction of its movement.

It is important to note that the dimension of the minimum turning radius established at 38 for the innermost loop 20 also applies to the radius turned by the bypass 44. Thus the radius of bypass 44 must be at least as great as the minimum turning radius 38.

With bypass 44 activated, the conveying channel 12 of the tank 10 comprises an uninterrupted loop which allows for the continuous flow of the blocks of cheese in a single direction in the tank for an indefinite period. Pumps 42 maintain a continuous flow of the brine circulating through the length of the continuous conveying channel by providing a horizontal flow vector. When the cheese has been treated for the desired length of time, the bypass is deactivated by closing bypass gates 46 to the position shown in solid lines in FIG. 1, whereby the blocks of cheese will pass to exit 28 and can thus be removed from the tank.

While the bypass is in operation, pumps 42 typically maintain the flow of liquid in the conveying channel. Simultaneously, liquid can be drained back into tank 30 and replenished by either pump 32 or pumps 42, whereby the liquid can be treated as desired, for example filtered, and fresh treating liquid provided to the conveying channel.

In yet another method of treating blocks of cheese for an indefinite period of time, the flow of the brining liquid in tank 10 is periodically reversed. This technique will work effectively so long as there is some unused space in the tank along the length of conveying channel 12. In this embodiment of the method of treating the blocks of cheese, the blocks enter the tank at inlet 26 as described previously and traverse conveying channel 12 toward exit 28, also as described previously. The placing of blocks of cheese is terminated before the tank is totally filled. As the cheese traversing the tank approaches the exit 28, the flow of liquid in the tank is reversed. The reverse of the liquid flow is effected by conveying the output of pump 32 into the channel at exit 28, and by drawing liquid from the conveying channel 12 at inlet 26. As the flow of the liquid in conveying channel 12 is reversed, the cheese blocks which have accumulated toward exit 28 will flow in the reverse direction along with the reverse flow of the liquid, namely toward the inlet 26. As the blocks approach inlet 26, the flow of the liquid is again reversed. The flow of the liquid can, of course, be affected by appropriate valving which is conventional and well known.

By thus periodically reversing the flow of the liquid, the cheese blocks are repeatedly passed under the drip pipes 40 whereby the brine liquid is maintained fresh on the tops of the cheese blocks.

The conveying channel 12 comprises a space 53 defined between bottom 51, an inner wall surface 52 and an outer wall surface 54. The minimum turning radius 38 is defined in terms of the minimum radius traversed by the inner wall surface 52 of the channel member 14 of the innermost loop 20.

An important feature of tanks of the invention is the minimum turning radius 38 as illustrated in FIG. 1. All turning radii which turn at least about 90 degrees or more must satisfy the dimensions of the minimum turning radius with respect to the size of the blocks of cheese being treated. As seen previously, the minimum turning radius in linear dimension is at least 0.4 times the maximum length dimension of the cheese blocks, and preferably at least 0.8 times the maximum length dimension. While larger radii may be used in the tanks of the invention, they are less preferred because they will use more of the precious floor space in the manufacturing operation. Since the brining process normally is practiced in a chilled room, the size of the tank will affect the size of the room which must be chilled. Thus the floor area occupied by the tank should be minimized by virtue of defining the minimum effective turning radius and using that minimum turning radius in the design of the tank as illustrated in FIG. 1, both on the innermost loop and the construction of the bypass 44.

Spaces 55 between pairs of loops, and in the center of the tank, generally represent a walking area, which can be reached, for example, by catwalks. Spaces 55 are useful for operator observation and inspection operations, and for cleaning and maintenance of the tank.

Figure 3:
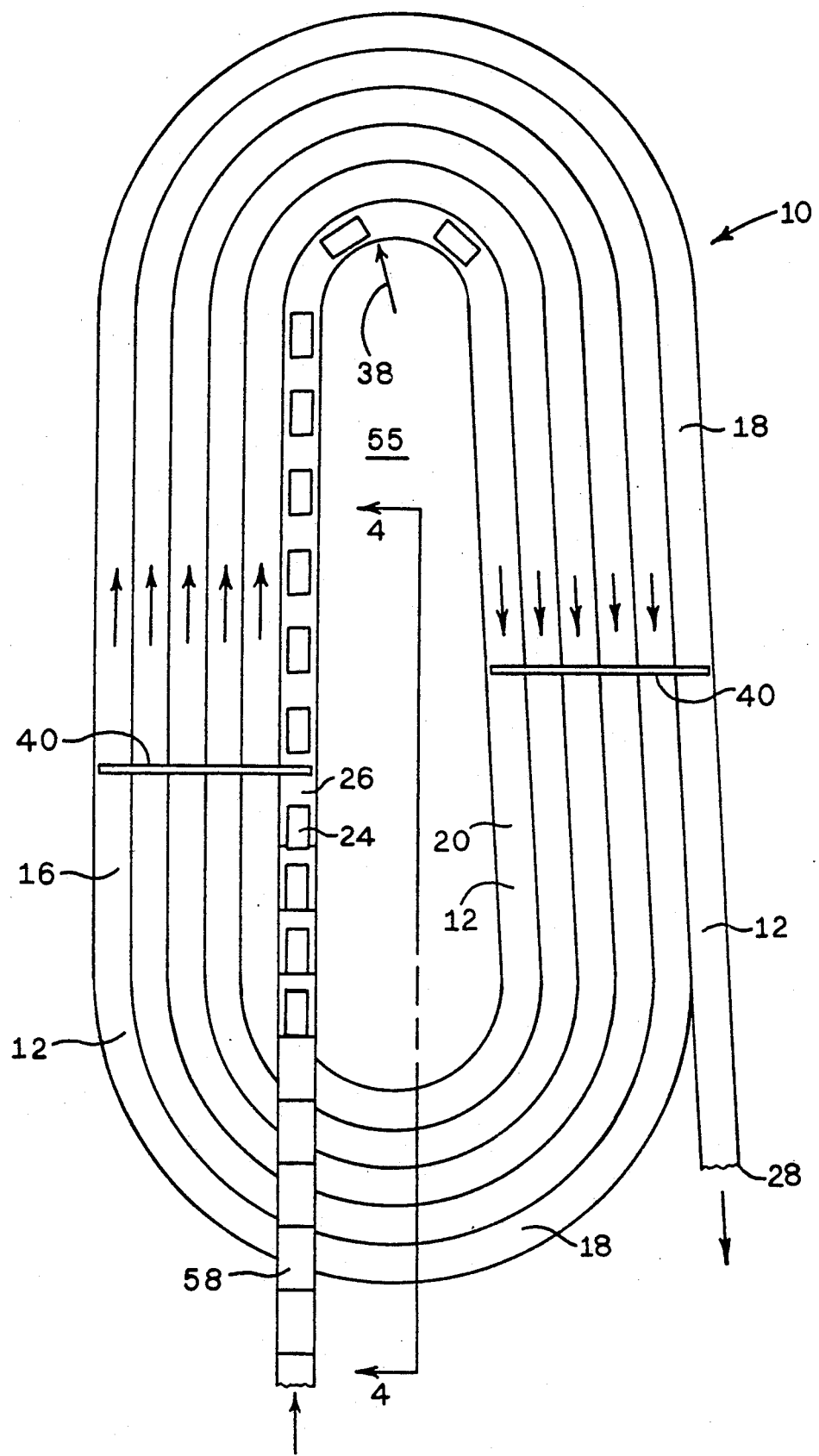
FIG. 3 shows a top view of a second embodiment of tanks of this invention.
Figure 4:
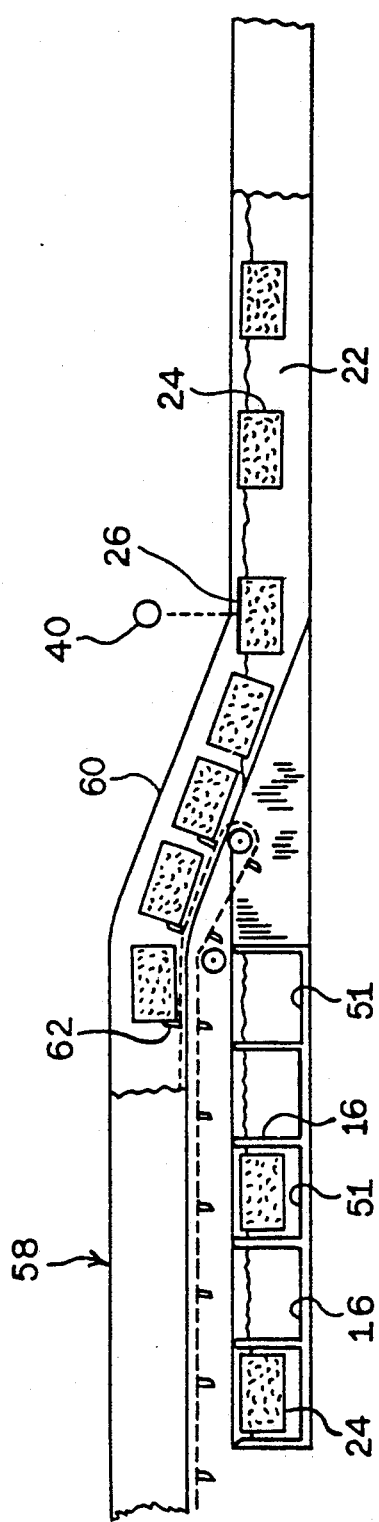
FIG. 4 shows a cross-section, with portions cut away, of part of the tank of FIG. 3 and is taken at 4—4 of FIG. 3.

Another embodiment illustrating the use of the minimum turning radius of the invention is seen in FIGS. 3 and 4. In that embodiment, the tank treatment inlet 26 is positioned at the innermost loop 20 of the tank. The tank loops comprise individual spirals, or conveying channels, rather than the pairs of channel members 14A and 14B seen in the embodiment of FIG. 1. The conveying channel 18 as seen in FIG. 3 comprises an outer loop and a plurality of inner loops, disposed within the outer loop and converging, one upon the other in the spiral arrangement, from the outer loop to the innermost loop 20.

In the FIG. 3 embodiment, all of the loops which are in side-by-side relationship carry the treating liquid, and thus the cheese blocks, in a common direction. For example, as seen in FIG. 3, all of the loops on the right side of the figure, show by their arrows that the direction of travel of the brine in the loops is all in the same direction. Accordingly on the left side of the figure, all of the loops on that side of the figure carry the liquid treatment stream in the same direction.

In this embodiment, the blocks of cheese are conveyed to inlet 26 by an elevated conveyer 58 which terminates in downwardly disposed portion 60 which delivers the blocks of cheese to the inlet 26. Pushing flights 62 of the conveyer engage the individual blocks of cheese and convey them along the conveyer 58.

In operation of the embodiment of FIGS. 3 and 4, the cheese blocks are introduced into the brine tanks at conveyer 58, and especially the downwardly disposed portion 60 which delivers the cheese blocks to the inlet 26 of the tank. The treating liquid is circulated in the tank from inlet 26 to outlet 28 in much the same manner as described for the embodiment of FIGS. 1 and 2. The embodiment of FIGS. 3 and 4 uses the same auxiliary equipment, such as the brine reservoir 30 and the pump 32, as well as the connecting liquid conveying drains and pipes between the brine tank 30, the pump 32, and the appropriate elements of the tank conveying channel 12; whereby the flow of the treating liquid from inlet 26 to exit 28 is effected. Accordingly, the cheese blocks float in the treating liquid and traverse the path of conveying channel 12 from inlet 26 to exit 28, much as the embodiment in FIGS. 1 and 2. The key to the successful operation of the tank embodied in FIGS. 3 and 4 is to assure that the sharpest turn that the cheese blocks are subjected to is the minimum turning radius as defined with respect to the example of FIGS. 1 and 2. The relationship between the dimensions of the cheese blocks and the width of the conveying channel are also complied with.

Drip pipes 40 are preferably used with any of the embodiments of the invention disclosed herein, and are accordingly shown at two locations in FIG. 3.

Figure 2:
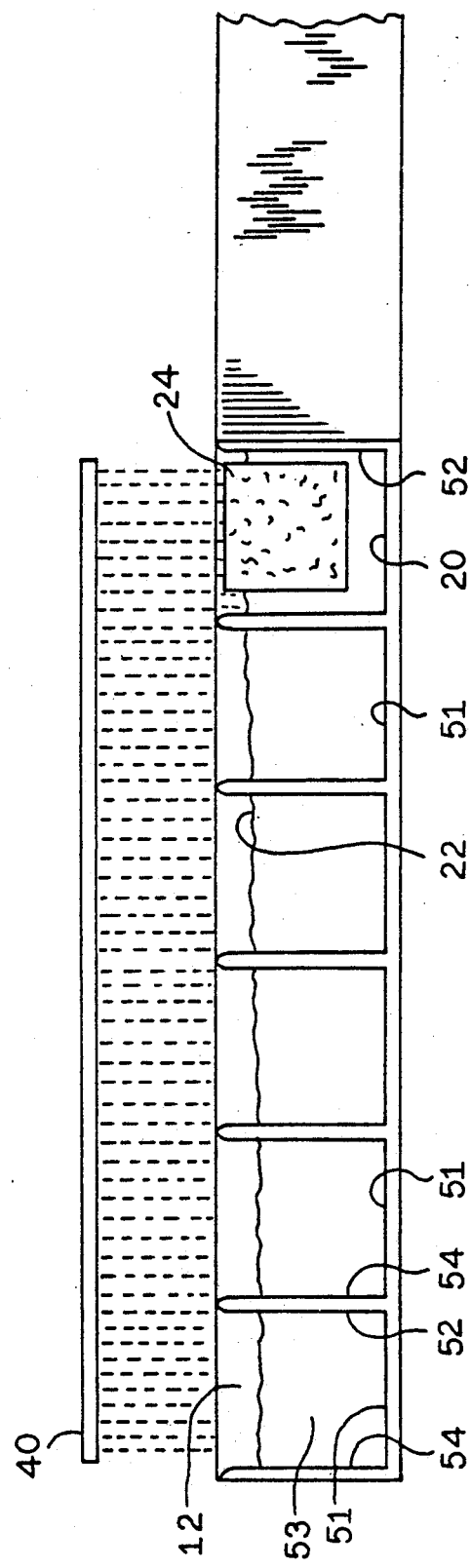
FIG. 2 is a cross-section taken at 2—2 of FIG. 1.

The reversal of flow of the treatment liquid in conveying channel 12, as described with respect to the embodiment of FIGS. 1 and 2, can be practiced in the embodiment of FIGS. 3 and 4 as well. Another mechanism for recycling cheese blocks 24 through the tank of FIG. 3 is by withdrawing the cheese blocks from the tank, for example at exit 28 and depositing them by an elevator or conveyor apparatus, not shown, into elevated conveyer 58 whereupon they are returned to entrance 26 through the normal operation of conveyer 58. The conveying mechanism for such operation would operate similar to elevator 50 as illustrated in FIG. 1.

Elevator 58 can approach entrance 26 from any upwardly directed location and angle. For example, elevator 58 can extend vertically upward from entrance 26. Namely elevator 58 can be directed in any direction outside the generally horizontal plane of the conveying channel 12, in order to preclude interference with the conveying channel.

Entrance 26 and exit 28 can reverse their functional roles where appropriate entrance and removal apparatus are provided in cooperation with the iterated entrance and exit channel member portions. Entrance 26 can thus be adapted to function as an exit. Exit 28 can likewise be adapted to functional as an entrance.

Those skilled in the art will now see that certain modifications can be made to the apparatus and methods herein disclosed with respect to the preferred embodiments, without departing from the spirit of the instant invention. And while the invention has been described above with respect to it preferred embodiments, it will be understood that the invention is capable of numerous rearrangements, modifications, and alterations, and all such arrangements, modifications, and alterations are intended to be within the scope of the appended claims.

Having thus defined the invention, what is claimed is:

1. A tank for treating units of product with a liquid, the units of product having length dimensions, said tank comprising a conveying channel, said conveying channel being configured a series of loops, and having inner wall surfaces of said conveying channel disposed toward the inside of said loops, said conveying channel converging from an outer perimeter defined by an outermost one of said loops to an innermost one of said loops, said innermost loop defining a minimum turning radius in said conveying channel at said inner wall surface of said innermost loop, the numerical dimension of said minimum turning radius being at least 0.4 times said length dimension through the longest one of said units of product to be treated.

2. A tank as in claim 1 wherein the numerical dimension of said minimum turning radius is at least 2 inches.

3. A tank as in claim 1 wherein the numerical dimension of said minimum turning radius is at least 4 inches.

4. A tank as in claim 1 wherein said minimum turning radius is at least 0.8 times said length dimension.

5. A tank as in claim 1 and including an entrance channel extending from said innermost loop outwardly across said series of loops toward said outer perimeter.

6. A tank as in claim 1 wherein said loops in said conveying channel comprise a pair of first and second side-by-side conveying channel members, innermost portions of said pair of channel members defining said innermost loop, said innermost portions of said first and second conveying channel members of said innermost loop being separated from side-by-side relationship over a portion of said innermost loop and joining with each other as in end-to-end relationship such that liquid flowing between said first and second conveying channel members traverses a radius at least as great as said minimum turning radius.

7. A tank as in claim 1 wherein the units of product have a width dimension no greater than the said length dimension, the width of said conveying channel being between about 1.03 times and about 1.5 times said width dimension.

8. A tank as in claim 2 wherein the units of product have a width dimension no greater than said length dimension, the width of said conveying channel being between about 1.03 times and about 1.5 times said width dimension.

9. A tank as in claim 3 wherein the units of product have a width dimension no greater than said length dimension, the width of said conveying channel being between about 1.03 times and about 1.5 times said width dimension.

10. A tank as in claim 4 wherein the units of product have a width dimension no greater than said length dimension, the width of said conveying channel being between about 1.03 times and about 1.5 times said width dimension.

11. A tank as in claim 5 wherein the units of product have a width dimension no greater than said length dimension, the width of said conveying channel being between about 1.03 times and about 1.5 times said width dimension.

12. A tank as in claim 6 wherein the units of product have a width dimension no greater than said length dimension, the width of said conveying channel being between about 1.03 times and about 1.5 times said width dimension.

13. A tank as in claim 7 wherein the dimension of said minimum turning radius is no more than 1.5 times said length dimension.

14. A tank as in claim 11 wherein the dimension of said minimum turning radius is no more than 1.5 times said length dimension.

15. A tank as in claim 12 wherein the dimension of said minimum turning radius is no more than 1.5 times said length dimension.

16. A tank as in claim 1 and including means for withdrawing liquid from said conveying channel at a first location, means for adding liquid to said conveying channel at a second location, and a barrier, in said conveying channel, to flow of liquid between said first and second locations.

17. A tank as in claim 5 and including means for withdrawing liquid from said conveying channel at a first location, means for adding liquid to said conveying channel at a second location, and a barrier, in said conveying channel, to flow of liquid between said first and second locations.

18. A tank as in claim 6 and including means for withdrawing liquid from said conveying channel at a first location, means for adding liquid to said conveying channel at a second location, and a barrier, in said conveying channel, to flow of liquid between said first and second locations.

19. A tank as in claim 7 and including means for withdrawing liquid from said conveying channel at a first location, means for adding liquid to said conveying channel at a second location, and a barrier, in said conveying channel, to flow of liquid between said first and second locations.

20. A tank as in claim 8 and including means for withdrawing liquid from said conveying channel at a first location, means for adding liquid to said conveying channel at a second location, and a barrier, in said conveying channel, to flow of liquid between said first and second locations.

21. A tank as in claim 16 and including means for recycling liquid between said first and second locations.

22. A tank as in claim 16 and including means for conveying units of solid product out of said conveying channel, over said barrier, and back into said conveying channel.

23. A tank as in claim 6 and including outermost portions of said pair of channel members defining said outermost loop, said first and second conveying channel members extending from said outermost portions and being separated from side-by-side relationship, and including means for joining said first and second conveying channel members with each other, as in end-to-end relationship, such that liquid flowing between said outermost portions of said first and second conveying channel members traverses a radius at least as great as said minimum turning radius.

24. A tank as in claim 1 and including means for applying liquid to exposed portions of units of product in said conveying channel.

25. A tank, said tank comprising an elongated conveying channel, said elongated conveying channel comprising (i) a first innermost liquid flow loop, (ii) a second liquid flow loop disposed outwardly of, and entirely circumscribing, said first innermost liquid flow loop, and (iii) a third liquid flow loop disposed outwardly of, and entirely circumscribing, said second liquid flow loop, said first and second liquid flow loops, and said second and third liquid flow loops, being connected to each other, respectively, by segments of said elongated conveying channel extending therebetween.

26. A tank, said tank comprising a conveying channel, said conveying channel comprising a pair of first and second side-by-side conveying channel members arranged in loops, said loops converging from an outer perimeter defined by an outermost loop, to an innermost loop defined by portions of said pair of said channel members, said innermost portions of said first and second conveying channel members being separated from side-by-side relationship over a portion of said innermost loop and joining with each other as in end-to-end relationship such that liquid entering said innermost loop through one of said first and second conveying channel members leaves said innermost loop through the other of said first and second conveying channel members.

27. A tank as in claim 26 and including means for withdrawing liquid from said conveying channel at a first location, means for adding liquid to said conveying channel at a second location, and a barrier, in said conveying channel, to flow of liquid between said first and second locations.

28. A tank as in claim 26 and including outermost portions of said pair of channel members, defining said outermost loop, said first and second conveying channel members extending from said outermost loop and being separated from side-by-side relationship, and including means joining said first and second conveying channel members with each other as in end-to-end relationship.

29. A tank as in claim 28 wherein liquid flowing between said first and second conveying channel members traverses a radius dimension at least as great as a minimum radius defined as 0.4 times the numerical maximum straight line dimension through the largest units of product to be treated with said tank, said straight line dimension being defined in a horizontal plane.

30. A tank as in claim 26 and including means for applying liquid to exposed portions of units of product in said conveying channel in said loops.

31. A tank as in claim 23 wherein said conveying channel is continuous, and including means for maintaining a continuous flow of said liquid circulating through the length of said continuous conveying channel.

32. A tank as in claim 28 wherein said conveying channel is continuous, and including means for maintaining a continuous flow of said liquid circulating through the length of said continuous conveying channel.

33. A tank as in claim 29 wherein said conveying channel is continuous, and including means for maintaining a continuous flow of said liquid circulating through the length of said continuous conveying channel.

34. A system for treating units of product with a liquid, said system comprising:
(a) a plurality of units of said product to be treated, said units each having a length and a width;
(b) a tank, said tank comprising a conveying channel, said conveying channel being configured as a series of loops, and having inner wall surfaces of said conveying channel disposed respectively toward the inside of respective ones of said loops, said conveying channel converging, from an outer perimeter defined by an outermost one of said loops, to an innermost loop, said innermost loop defining a minimum turning radius in said conveying channel at said inner wall surfaces of said innermost loop, the numerical dimension of said minimum turning radius being at least 0.4 times the length of the longest one of said units to be treated; and
(c) a liquid in said conveying channel for treating said units,
said units being disposed in said liquid in said tank.

35. A system as in claim 34, the width of said conveying channel being between about 1.03 times and about 1.5 times said width.

36. A system as in claim 34 and including means for withdrawing liquid from said conveying channel at a first location, means for adding liquid to said conveying channel at a second location, and a barrier, in said conveying channel, to flow of liquid between said first and second locations.

37. A system as in claim 34 wherein said conveying channel is continuous, and including means for maintaining a continuous flow of said liquid circulating through the length of said continuous conveying channel.

38. A system for treating units of a product with a liquid, said system comprising:
(a) a plurality of units of said product to be treated, said units each having a length and a width;
(b) a tank, said tank comprising a conveying channel, said conveying channel comprising a pair of first and second side-by-side conveying channel members arranged in loops, said loops converging from an outer perimeter defined by an outermost loop, to an innermost loop defined by innermost portions of said pair of said channel members, said innermost portions of said first and second conveying channel members, of said innermost loop, being separated from side-by-side relationship over a portion of said innermost loop and joining with each other as in end-to-end relationship such that liquid entering said innermost loop through one of said first and second conveying channel members leaves said innermost loop through the other of said first and second conveying channel members; and
(c) a liquid in said tank conveying channel for treating said units, said units being disposed in said liquid in said tank.

39. A system as in claim 38 wherein said conveying channel is continuous, and including means for maintaining a continuous flow of said liquid circulating through the length of said continuous conveying channel.

40. A tank as in claim 25, said loops converging, one upon the other from said third liquid flow loop to said first innermost liquid flow loop.

41. A tank as in claim 40, said tank comprising means for conveying units of product between said conveying channel at said innermost loop and the outside environment, whereby units of product can enter or exit said tank at said innermost loop.

* * * * *